(12) United States Patent
Mangetsu

(10) Patent No.: US 7,715,357 B2
(45) Date of Patent: May 11, 2010

(54) RADIO LAN SYSTEM USING COMMUNICATION APPARATUS, AND METHOD FOR SETTING OPERATION MODE

(75) Inventor: Kenji Mangetsu, Shizuoka (JP)

(73) Assignee: NEC Access Technica, Ltd., Kakegawa-shi (JP)

( * ) Notice: Subject to any disclaimer, the term of this patent is extended or adjusted under 35 U.S.C. 154(b) by 491 days.

(21) Appl. No.: 11/812,587

(22) Filed: Jun. 20, 2007

(65) Prior Publication Data
US 2007/0299971 A1  Dec. 27, 2007

(51) Int. Cl.
*H04L 12/28* (2006.01)
*H04Q 7/24* (2006.01)
*H04B 7/216* (2006.01)
*H04J 3/00* (2006.01)

(52) U.S. Cl. ........................ 370/338; 370/252; 370/328; 370/335; 370/389; 370/392; 370/521; 709/238

(58) Field of Classification Search .................. 370/252, 370/356, 328–392, 401–466, 521; 375/130–136, 375/219–225; 455/404.1, 406–439; 709/206–248; 386/46, 125, 126
See application file for complete search history.

(56) References Cited
U.S. PATENT DOCUMENTS 5,535,199 A * 7/1996 Amri et al. .................. 370/392
7,272,135 B1 * 9/2007 Ohtsu et al. ................. 370/356
7,280,507 B2 * 10/2007 Miyajima et al. ............ 370/331
7,408,906 B2 * 8/2008 Griswold et al. ............ 370/338
2001/0008546 A1 7/2001 Fukui et al.
2004/0101035 A1 * 5/2004 Boer et al. .................. 375/219
2007/0237176 A1 * 10/2007 Bartlett et al. .............. 370/468

FOREIGN PATENT DOCUMENTS

| JP | 05-145437 | | 6/1993 |
|---|---|---|---|
| JP | 10-294769 | | 11/1998 |
| JP | 2000-092235 | A | 3/2000 |
| JP | 2001-111432 | | 4/2001 |
| JP | 2001-111432 | A | 4/2001 |
| JP | 2001-275112 | | 10/2001 |
| JP | 2001-275112 | A | 10/2001 |
| JP | 2004-064171 | | 2/2004 |
| JP | 2005-159774 | | 6/2005 |

* cited by examiner

*Primary Examiner*—Afsar M. Qureshi
(74) *Attorney, Agent, or Firm*—Foley & Lardner LLP

(57) ABSTRACT

A radio LAN system includes a server configured to hold a file; an access point connected with the server; a LAN terminal connected with the access point by radio; and a client terminal configured to issue a file transfer request to the server. An operation mode between the access point and the LAN terminal is set to a non-compression mode in which compression of the file is not performed, when the file is in a compressed state, and to a compression mode in which compression of the file is performed, when the file is in a non-compressed state. The file is transferred from the server to the client terminal in the operation mode in response to the file transfer request.

17 Claims, 12 Drawing Sheets

RADIO LAN SYSTEM USING COMMUNICATION APPARATUS, AND METHOD FOR SETTING OPERATION MODE

TECHNICAL FIELD

The present invention relates to a radio LAN (Local Area Network) system, and more specifically to a radio LAN system which performs compression processing in data transfer on a radio LAN.

BACKGROUND ART

Data communication formats and types of data have become diversified due to increase of a communication rate. Under such circumstances, there is a demand for improving communication quality through performing more efficient communication by optimizing a type of data and a communication method of the data.

In particular, in a radio LAN (Local Area Network), a method is known in which data compression is performed on a radio LAN. In this case, it has no effect even if a secondary compression is further applied to the data to which primary compression has already being applied. Rather, a transfer time may be increased for the operation processing required for the secondary compression.

In conjunction with the above description, Japanese Laid Open Patent Publication (JP-P2001-111432A) discloses a data compression control apparatus. This data compression control apparatus controls compression processing of data to be transmitted, and includes a compression section adapted to compress the data, and a path selection section adapted to select a processing path for the data to be transmitted. The path selection section determines whether or not to compress the data to be transmitted by the compression section in accordance with a physical or logical type of a communication interface that transmits the data.

Also, Japanese Laid Open Patent Publication (JP-P2001-275112A) discloses a data compression apparatus. This data compression apparatus is used for a data transmission apparatus, and includes a transmission mode selection section adapted to select a first transmission mode or a second transmission mode in accordance with data indicative of a type of input data. A data compression section compresses the input data and sends it out to a data output terminal. A switching section sends out the input data to the data output terminal in the first transmission mode and sends out the input data to the data compression section in the second transmission mode.

Japanese Laid Open Patent Publication (JP-P2004-064171A) discloses an information processing apparatus. This information processing apparatus transmits a digital video data through radio communication, and includes a first video data compression section to compress the digital video data with a first compression rate, and a second video data compression section to compress the digital video data with a second compression rate. A detection section detects the radio communication state. A switching section outputs the video data by switching one of the first video data compression section and the second video data compression section in accordance with the radio communication state detected by the detection section.

Also, Japanese Laid Open Patent Publication (JP-P2005-159774A) discloses an image transmission apparatus. This image transmission apparatus transmits and receives an image data via a telecommunication line, and includes an image input section adapted to input an image data. An image encoding section encodes the image data into a compressed image when the image data is not a compressed image, and re-encodes the compressed image with a different compression rate. A compressed image capacity detecting section detects a capacity of the compressed image. A transmission rate detecting section detects a transmission rate when transmitting the compressed image data. A transmission time calculation section calculates a transmission time of the compressed data based on the compressed image capacity that is detected by the compressed image capacity detecting section, and the transmission rate that is detected by the transmission rate detecting section. An image compression conversion determining section determines whether or not to compresses the compressed image further with a higher expression rate, based on the calculated transmission time. A condition storing section stores parameters for determination of whether or not to perform re-compression by the image compression conversion determining section.

Also, Japanese Laid Open Patent Publication (JP-A-Heisei 5-145437) discloses a data transmission system. This data transmission system includes a compression processing section for compressing a data. A data transmission time estimating section estimates from a speed of a communication line and a data compression time, a data transmission execution time spent for data transmission (from transmission of the data by applying compression processing to reception and decompression of the data) when the compression processing of the data is applied. The data transmission time estimating section estimates a data transmission execution time (from transmission of the data until reception of the data) when the compression processing is not applied. The data transmission time estimating section determines, before transmitting the data, whether to transmit the compressed data to which data compression processing is applied or the data to which the processing is not applied, based on the estimated transmission execution time. A data transmission executing section transmits the data based on the determination by the data transmission time estimating section.

Japanese Laid Open Patent Publication (JP-A-Heisei 10-294769) discloses a relay apparatus. This relay apparatus is connected to a computer network and exchanges communication data via the network. The relay apparatus includes a compression determination table which stores compression/non-compression of the communication data for each control data of protocol headers of the communication data, and the compression mode when the data is compressed. A control data obtaining section obtains control data that is registered in the datable, from the protocol header of the communication data. In a compression mode selecting section, a data compression determining section determines whether or not compression is necessary and the compression mode when being determined to perform the compression, in accordance with a corresponding compression type that is searched from the compression determination table by using the control data obtained by the control data obtaining section as a key. A data compression section generates compressed communication data by compressing the communication data when being determined by the compression determining section that compression of the communication data is necessary. A transmission section transmits the communication data when being determined by the data compression determining section that compression is unnecessary, and transmits the compressed communication data as the transmission data when being determined that the compression of the communication data is necessary.

SUMMARY

The present invention provides a radio LAN system which optimizes a transfer method in accordance with a type of data.

Also, the present invention provides a radio LAN system which achieves improvements in a transfer speed by dynamically changing a data transfer method in accordance with the types of the data.

In a first exemplary aspect of the present invention, a radio LAN system includes a server configured to hold a file; an access point connected with the server; a LAN terminal connected with the access point by radio; and a client terminal configured to issue a file transfer request to the server. An operation mode between the access point and the LAN terminal is set to a non-compression mode in which compression of the file is not performed, when the file is in a compressed state, and to a compression mode in which compression of the file is performed, when the file is in a non-compressed state. The file is transferred from the server to the client terminal in the operation mode in response to the file transfer request.

Also, in a second exemplary aspect of the present invention, a method of setting an operation mode, includes providing a radio LAN system comprising a server, an access point; a LAN terminal; and a client terminal; setting an operation mode between the access point and the LAN terminal to one of a non-compression mode in which compression of a file is not performed, and a compression mode in which compression of the file is performed; issuing a file transfer request from the client server; and transferring the file from the server to the client terminal through the access point and the LAN terminal in the operation mode in response to the file transfer request.

In a third exemplary aspect of the present invention, a communication terminal includes a radio LAN communication unit configured to perform communication on a radio LAN; an extension determining unit configured to determine an operation mode based on an extension of a file name of a file to be transferred on the radio LAN; and a mode switching unit configured to set one of a compression mode in which the file is compressed, and a non-compression mode in which the file is not compressed.

In a fourth exemplary aspect of the present invention, a method of setting an operation mode, includes relaying data on a radio LAN; and setting one of a compression mode in which the file is compressed, and a non-compression mode in which the file is not compressed in response to a request received externally.

BRIEF DESCRIPTION OF THE DRAWINGS

The above and other objects, advantages and features of the present invention will be more apparent from the following description of certain preferred embodiments taken in conjunction with the accompanying drawings, in which.

EXEMPLARY EMBODIMENTS

Hereinafter, a radio LAN (Local Area Network) system according to exemplary embodiments of the present invention will be described with reference to the attached drawings.

First Exemplary Embodiment

Figure 1:
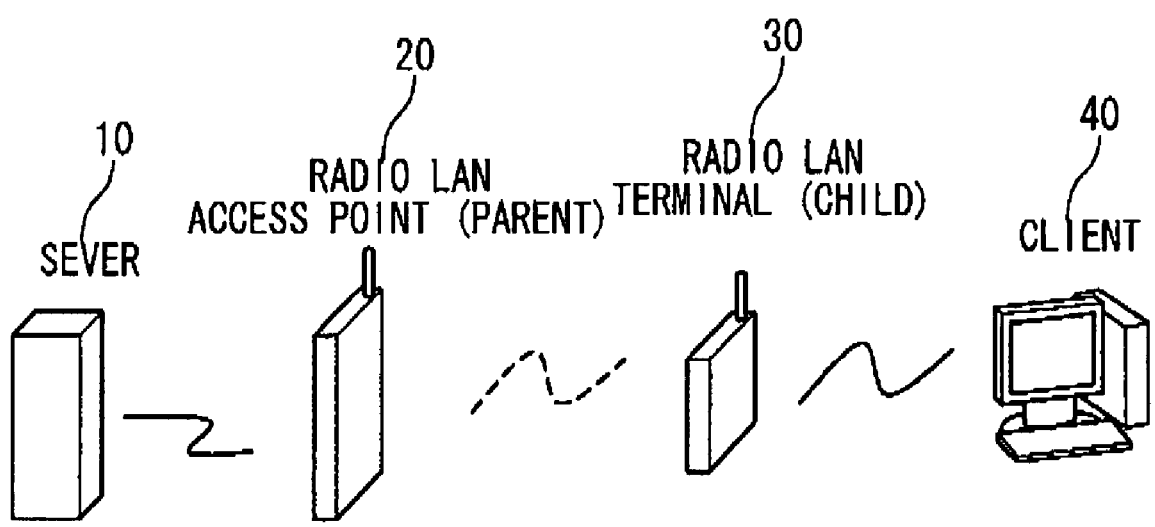
FIG. 1 is a diagram showing a configuration of a radio LAN system according to a first exemplary embodiment of the present invention.

FIG. 1 is a diagram showing a configuration of the radio LAN system according to a first exemplary embodiment of the present invention. The radio LAN system according to the first exemplary embodiment of the present invention includes a server 10, a radio LAN access point (master device) 20, a radio LAN terminal (slave device) 30, and a client terminal 40.

The server 10 stores data to be transferred to the client terminal 40, and is a server for data communication protocol such as FTP (File Transfer Protocol) or HTTP (Hyper Text Transfer Protocol). The data communication protocol is not limited to the FTP or the HTTP. The FTP and the HTTP are merely examples of the communication protocol that highly requires compression when a file is transferred. Practically, any kinds of data communication protocol may be used as long as it can be used between the server 10 and the client terminal 40. Further, the server 10 is assumed to be a typical computer such as a personal computer or a work station in this case. However, the present invention should not be restricted to the above-described case, and the server 10 may practically be any kinds of communication apparatus that corresponds to the data communication protocol such as the FTP or the HTTP. Examples thereof may be a portable terminal (mobile phone, PDA, etc.), information home appliances (television set, recording apparatus, and other digital home appliances), a game machine (portable type, household-use type), and an IP telephone apparatus.

The radio LAN access point (master device) 20 and the radio LAN terminal (slave device) 30 are connected to each other to provide a radio LAN communication between the serve 10 and the client terminal 40. The radio LAN access point (master device) 20 is located on the server 10 side. The radio LAN terminal (slave device) 30 is located on the client terminal 40 side. Herein, the radio LAN access point (master device) 20 and the radio LAN terminal (slave device) 30 communicate with each other by a radio LAN. A connection between the server 10 and the radio access point (master device) 20, and a connection between the radio LAN terminal (slave device) 30 and the client terminal 40 may be a radio connection or a wired connection.

The client terminal 40 receives data from the server 10 through an operation of a user. For example, the client terminal 40 functions as a client terminal under the data communication protocol such as the FTP or the HTTP. The data communication protocol is not limited to the FTP or the HTTP. The FTP and the HTTP are merely examples of the communication protocol that highly requires compression when a file is transferred. Practically, the data communication protocol may be of any kinds as long as the data communication protocol can be used between the server 10 and the client terminal 40. Further, the client terminal 40 is assumed to be a typical computer such as a personal computer or a work station in this case. However, the client terminal 40 should not be restricted to the above-described case, and the client terminal 40 may practically be any kinds of communication apparatus that corresponds to the data communication protocol such as the FTP or the HTTP. Examples thereof may be a mobile terminal (mobile phone, PDA, etc.), information home appliances (television set, recording apparatus, and other digital home appliances), a game machine (portable type, household-use type), and an IP telephone apparatus. That is, the devices of a same configuration may be used as the server 10 and the client terminal 40.

In the following description, a download operation of the exemplary embodiment will be described. However, it should be noted that the operation can be applied to an upload operation similarly.

Figure 2:
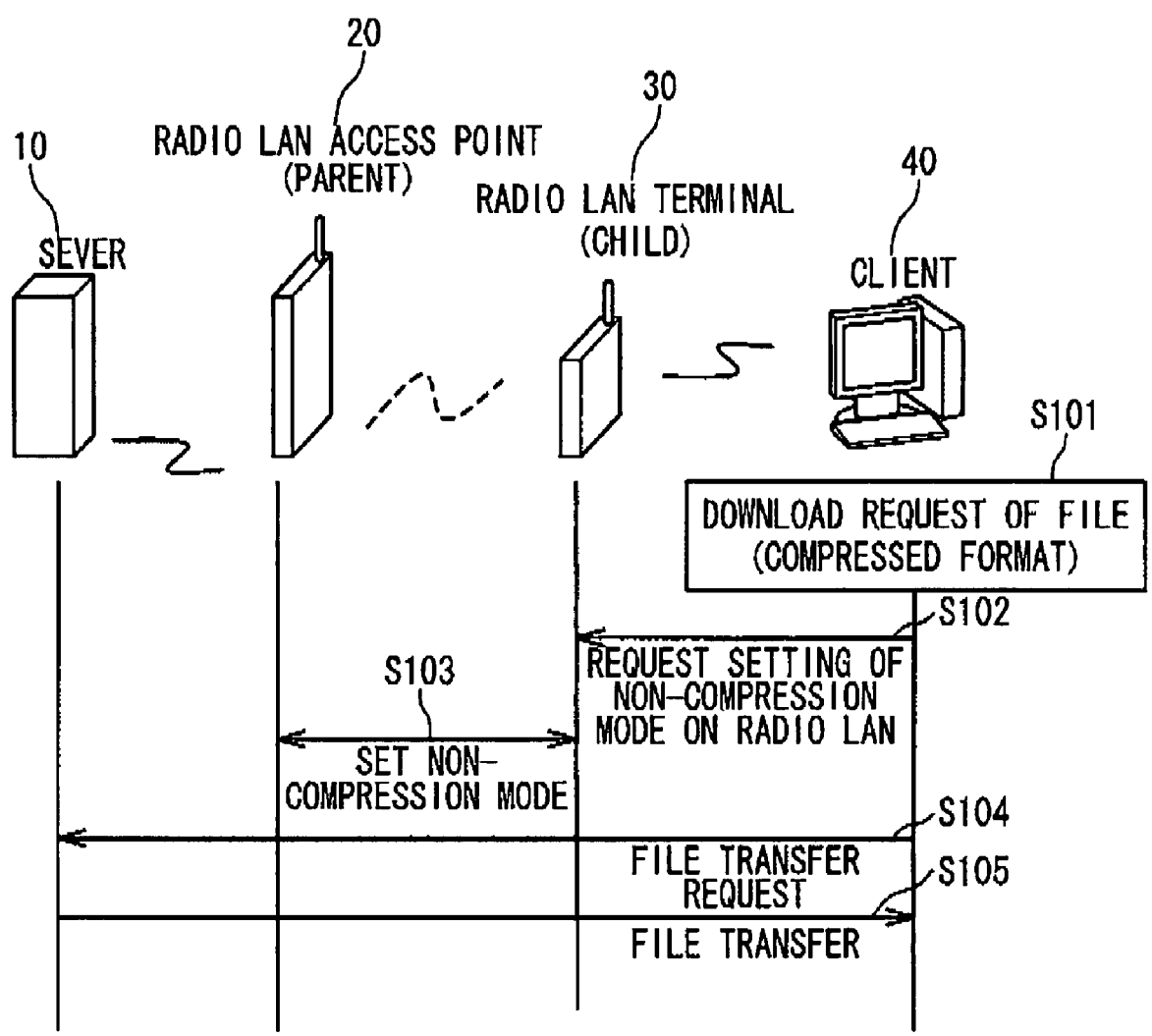
FIG. 2 is a sequence chart showing an operation in case of transfer of a compressed file.

FIG. 2 shows the operation at the time of transferring a compressed file.

(1) Step S101

First, a file name is designated when the client terminal 40 determines a request of a file transfer to the server 10. The designation of the file name is carried out by directly inputting to the client terminal 40 via a keyboard (letters input) or a microphone (voice input). Alternatively, a list of files stored in the server 10 may be displayed on a display device of the client terminal 40, and a desired file may be selected from the list of the files by operating a mouse or the keyboard. At this time, it is possible to determine whether or not the file has been compressed based on an extension of the file. For example, in general, the extension indicating the compression format such as "zip", "lzh", or "tgz" is added to the file name in many cases in accordance with the compression format, when the file is compressed. It is possible to determine whether or not the file has been compressed, or whether the file is in a compressed state, by checking whether or not the extension indicating the compression format is included in the file name. When an extension such as "GIF", "JPG (JPEG)", and "PNG" is added, it is possible to identify the file as a compression style of an image.

(2) Step S102

When it is detected by the client terminal 40 that the file has been compressed, the client terminal 40 gives an instruction to the radio LAN terminal (slave device) 30 not to perform compression.

(3) Step S103

Upon receiving the instruction, the radio LAN terminal (slave device) 30 resets a communication setting between the radio LAN terminal 30 and the radio LAN access point (master device) 20 to perform communication without compression for the communication performed thereafter. Depending on the circumstances, the connection is disconnected once, and it is reconnected thereafter. When the setting is completed, it is notified from the radio LAN terminal 30 to the client terminal 40.

(4) Step S104

After the resetting, the client terminal 40 issues a file transfer request to the server 10.

(5) Step S105

In response to the file transfer request, the server 10 transfers the file to the client terminal 40.

As described above, in FIG. 2, the client terminal 40 determines whether or not the file is compressed, from the extension of the file. When being detected that the file has been compressed, the client terminal 40 gives an instruction to the radio LAN terminal (slave device) 30 not to perform compression. In this case, however, the radio LAN terminal (slave device) 30 may perform those operations. For example, the radio LAN terminal (slave device) 30 receives the file name that is designated by the client terminal 40, and determines whether or not the file has been compressed, from the extension included in the file name. Upon detecting that the file is compressed, the radio LAN terminal (slave device) 30 resets the communication setting that has been set between the radio LAN terminal 30 and the radio LAN access point (master device) 20. Other operations are the same as in FIG. 2.

In such a case, the radio LAN terminal (slave device) 30 has a function of quickly switching between a compression mode and a non-compression mode. This function may be provided to a CPU (not shown) of the radio LAN terminal (slave device) 30.

Figure 3:
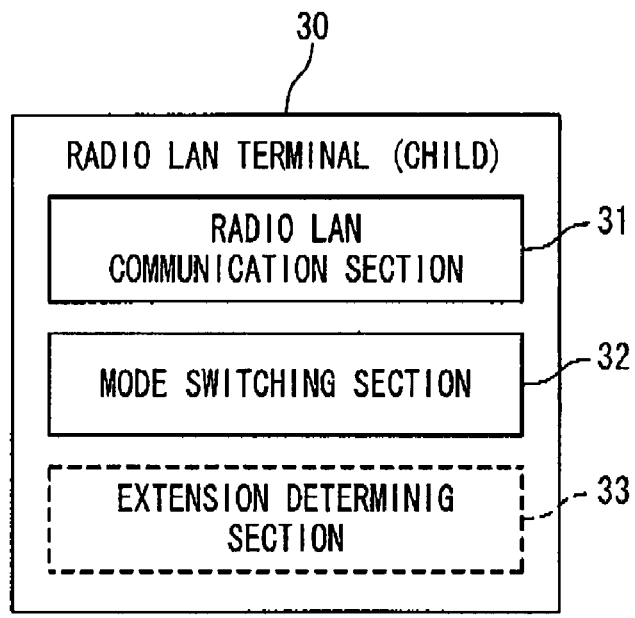
FIG. 3 is a block diagram showing the configuration of a radio LAN terminal.

Further, the client terminal 40 has a function of determining the extension of the file to be transferred. This function may be provided to a CPU (not shown) of the client terminal 40. In case that the radio LAN terminal (slave device) 30 determines the extension of the file instead of the client terminal 40, the radio LAN terminal (slave device) 30 has a function of determining the extension of the file to be transferred. That is, as shown in FIG. 3, the radio LAN terminal (slave device) 30 includes a radio LAN communication section 31 and a mode switching section 32. Further, the radio LAN terminal (slave device) 30 may include an extension determining section 33 as necessary. The radio LAN communication section 31 performs communication between the radio LAN access point (master device) 20 and the client terminal 40 on the radio LAN. For example, the radio LAN communication section 31 includes an antenna or a communication interface. The mode switching section 32 quickly switches an operation mode between the compression mode and the non-compression mode. The extension determining section 33 determines the extension of the file to be transferred.

Figure 4:
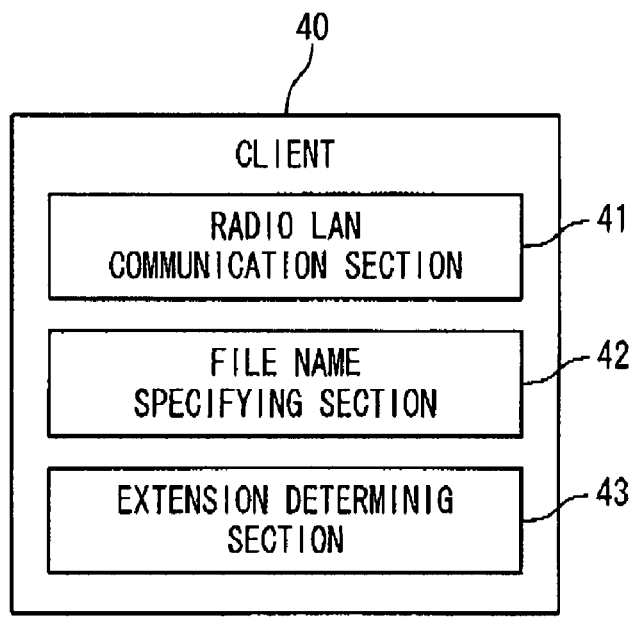
FIG. 4 is a diagram showing the configuration of a client terminal.

Further, as shown in FIG. 4, the client terminal 40 includes a radio LAN communication section 41, a file name designating section 42, and an extension determining section 43. The radio LAN communication section 41 communicates with the server 10 on the radio LAN via the radio LAN terminal (slave device) 30. The file name designating section 42 displays an input field for inputting a file name or a list of the files for selecting a file name to accept the file name. The extension determining section 43 determines or identifies the extension of the file to be transferred.

Figure 5:
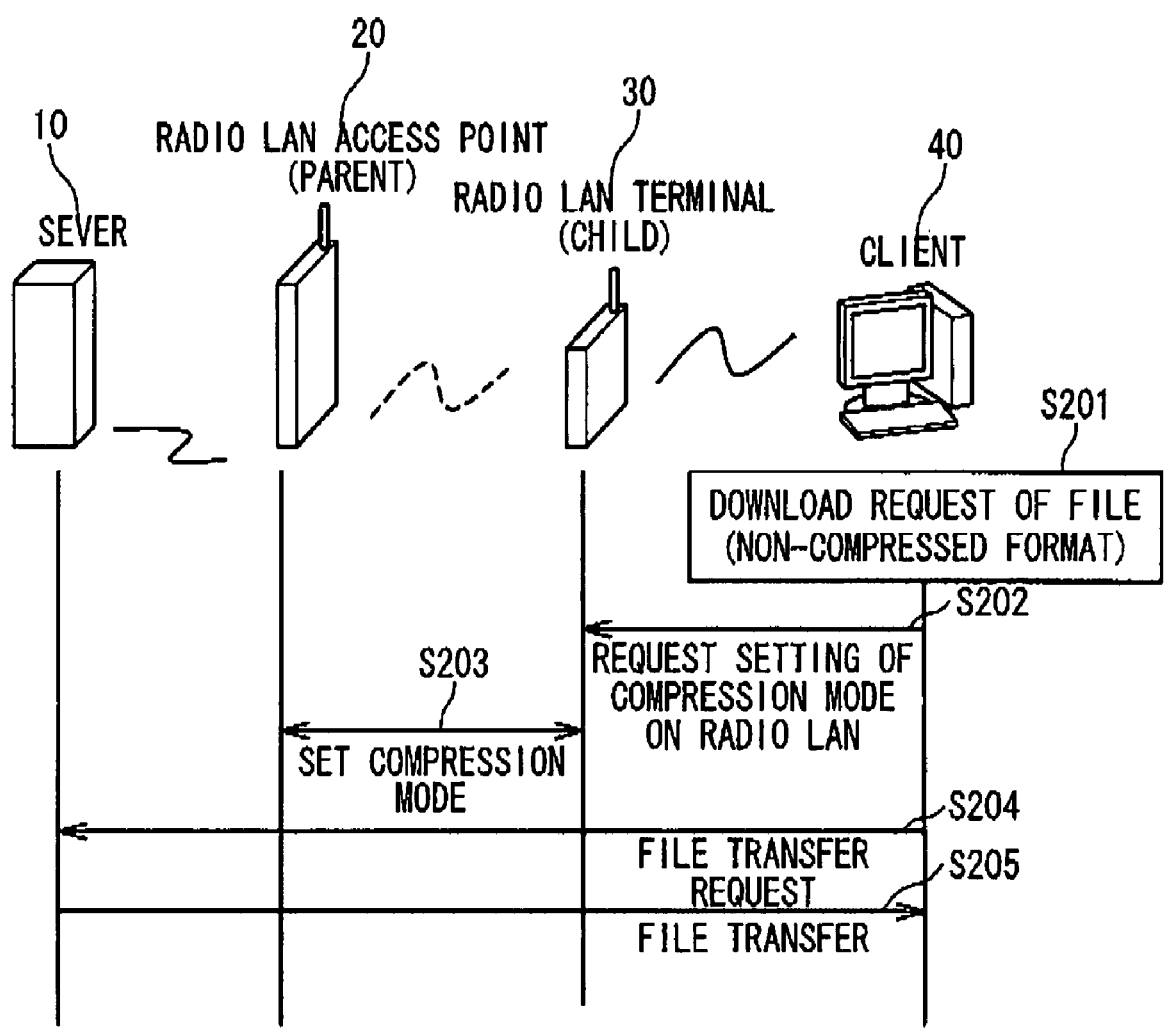
FIG. 5 is a sequence diagram showing an operation at a time of transferring a non-compressed file.

FIG. 5 shows an operation at the time of transferring a non-compressed file.

(1) Step S201

First, the file name is designated when the client terminal 40 determines a request of a file transfer to the server 10. At this time, it is possible to determine whether or not the file has been compressed, from the extension of the file.

(2) Step S202

When it is detected in the client terminal 40 that the file has not been compressed, the client terminal 40 gives an instruction to the radio LAN terminal (slave device) 30 to perform compression.

(3) Step S203

Upon receiving the instruction, the radio LAN terminal (slave device) 30 resets the communication setting that has been set between the radio LAN terminal 30 the radio LAN access point (master device) 20, to perform communication by compressing the data for the communication performed thereafter. Depending on the circumstances, the connection is disconnected once, and it is reconnected thereafter. When the setting is completed, it is notified from the radio LAN terminal 30 to the client terminal 40.

(4) Step S204

After the resetting, the client terminal 40 issues a file transfer request to the server 10.

(5) Step 205

In response to the file transfer request, the server 10 transfers the file to the client terminal 40.

Second Exemplary Embodiment

The radio LAN system according to a second exemplary embodiment of the present invention will be described hereinafter. An operation is carried out as follows when it is impossible to determine the compression state based on only an extension of the file to be transferred.

Figure 6:
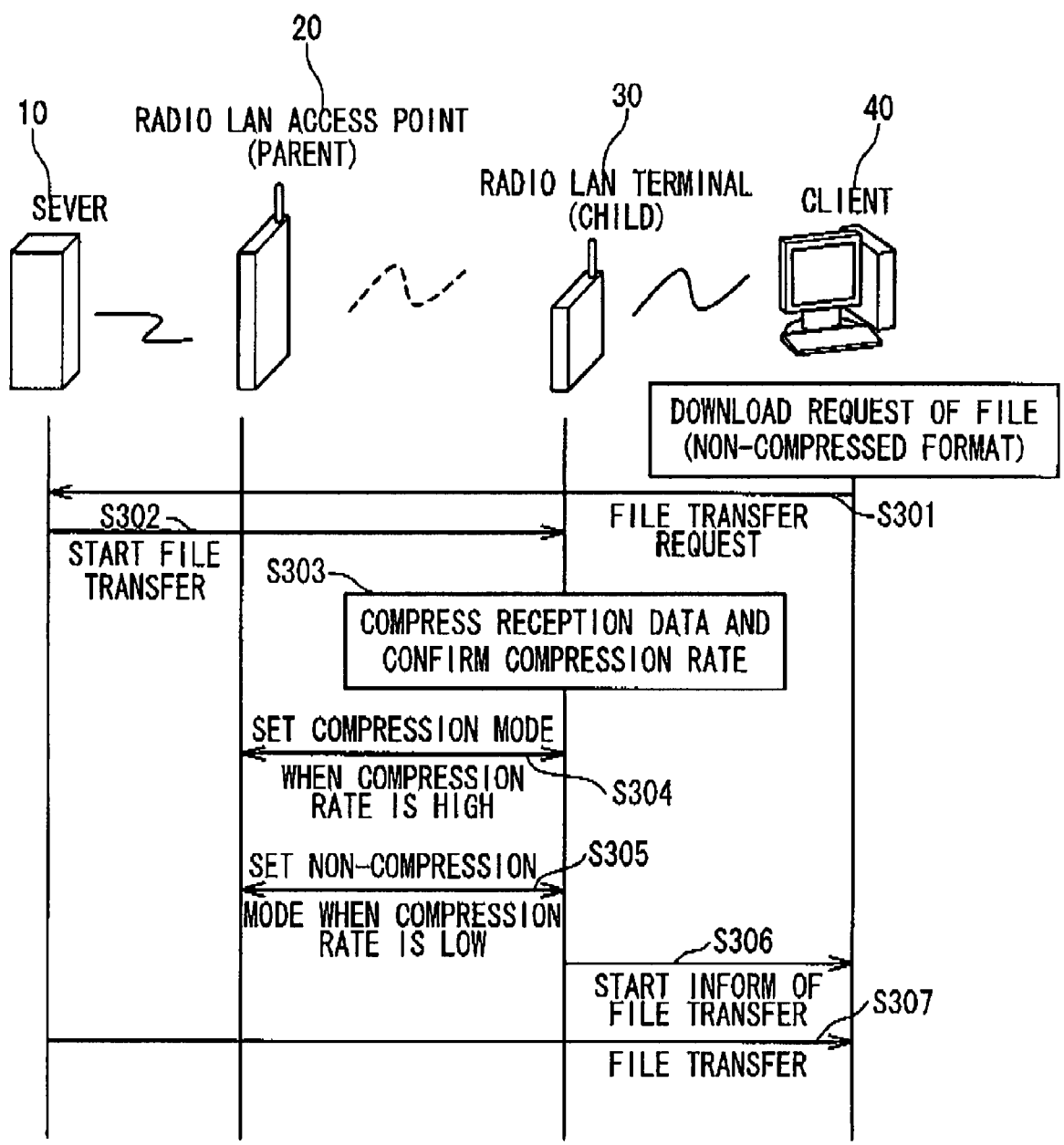
FIG. 6 is a sequence diagram showing an operation when it is impossible to determine the compressed state based on an extension.

FIG. 6 shows an operation when it is impossible to determine the compression state based on only the extension, and the mode is switched on the radio LAN terminal (slave device) 30 side.

(1) Step S301

The client terminal 40 issues a file transfer request to the server 10 to transfer a file. The communication setting of "non-compression" is initially set. Alternatively, there is no condition being set initially. Devices on the radio LAN determine to be "non-compression" when there is no condition set therein.

(2) Step S302

In response to the file transfer request, the server 10 transfers the file to the radio LAN terminal (slave device) 30.

(3) Step S303

The radio LAN terminal (slave device) 30 checks data sizes of the transferred file in the compressed state and the non-compressed state. For example, the radio LAN terminal (slave device) 30 compresses the received file, and checks a compression rate.

(4) Step S304

The radio LAN terminal (slave device) 30 sets the communication state of "compression" between the radio LAN terminal 30 and the radio LAN access point (master device) 20 so as to perform data compression in communication hereinafter, if the compression rate is higher than a predetermined threshold value. Depending on the circumstances, the connection is disconnected once, and it is reconnected thereafter. The threshold value is set in advance. When the compression rate is equal to the predetermined threshold value, the communication setting may be "compression" or "non-compression".

(5) Step S305

The radio LAN terminal (slave device) 30 sets the communication state of "non-compression" between the radio LAN terminal 30 and the radio LAN access point (master device) 20 so as to perform data non-compression in the communication hereinafter, if the compression rate is lower than the predetermined threshold value. Depending on the circumstances, the connection is disconnected once, and it is reconnected thereafter.

(6) Step S306

Thereafter, the radio LAN terminal (slave device) 30 informs to the client terminal 40, that the file transfer is started. At this time, the radio LAN terminal (slave device) 30 authorizes the transfer of the file from the server 10 to the client terminal 40. That is, a relay of the file transfer is started from the server 10 to the client terminal 40.

(7) Step S307

The server 10 transfers the file to the client terminal 40. In case of a "compression" mode, the file to be transferred is compressed. In case of a "non-compression" mode, the file to be transferred is not compressed.

Figure 7:
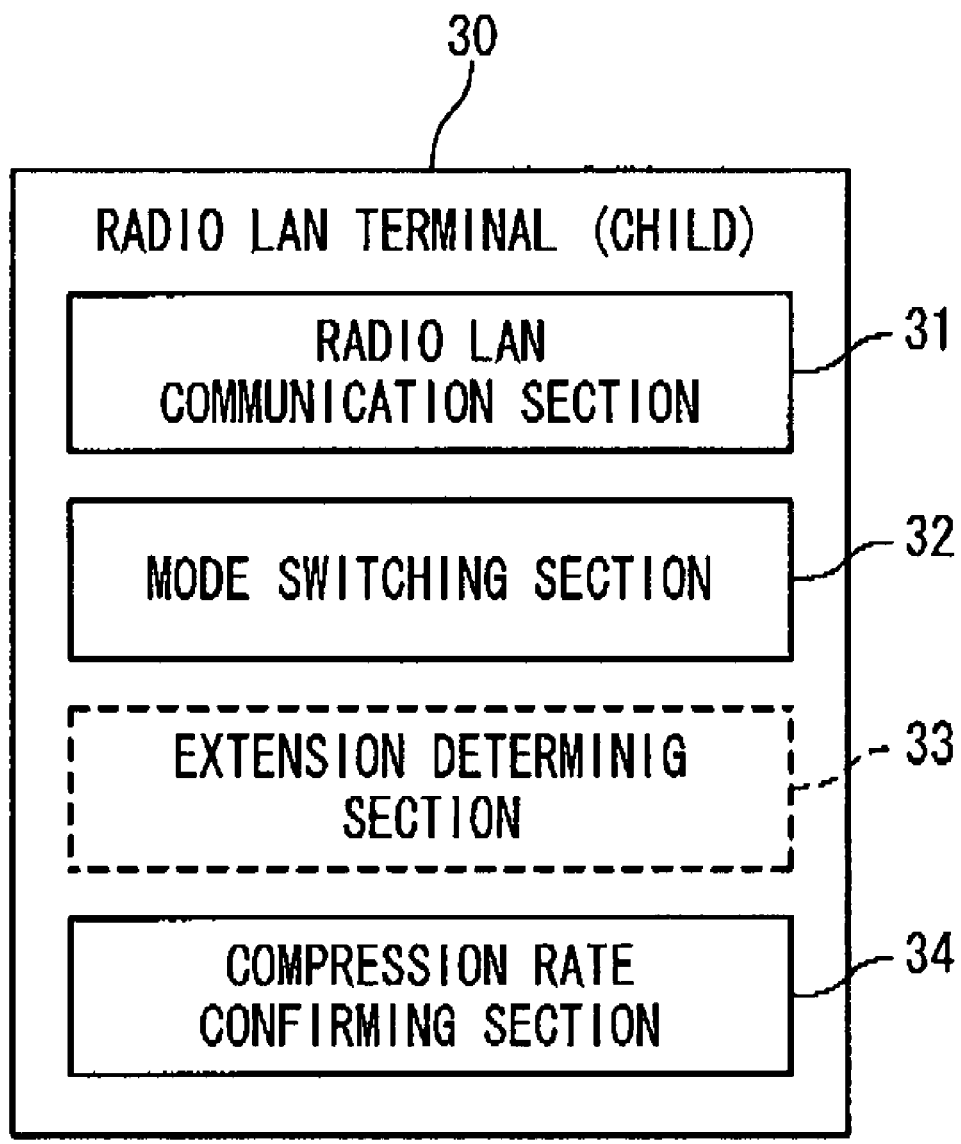
FIG. 7 is a block diagram showing the configuration of the radio LAN terminal.

As described above, the radio LAN terminal (slave device) 30 once checks the data size of the file transmitted from the server 10 in the compressed state and uncompressed state. When the compression rate at this time is considered effective, this file is transmitted in the compressed state, thereafter. If it is considered ineffective, the file is transmitted in the non-compressed state, thereafter. In this case, as shown in FIG. 7, the radio LAN terminal (slave device) 30 further includes a compression rate confirming section 34. The compression rate confirming section 34 checks the compression rate of the file, and compares it with a predetermined threshold value. The compression rate confirming section 34 may be included in the mode switching section 32.

Third Exemplary Embodiment

The radio LAN system according to a third exemplary embodiment of the present invention will be described hereinafter. In the first exemplary embodiment, the client terminal 40 gives an instruction to the radio LAN terminal (slave device) 30 to switch the mode based on the extension. However, it is also possible to request the radio LAN access point (master device) 20 from the server 10 to switch the mode based on the extension of the requested file.

Figure 8:
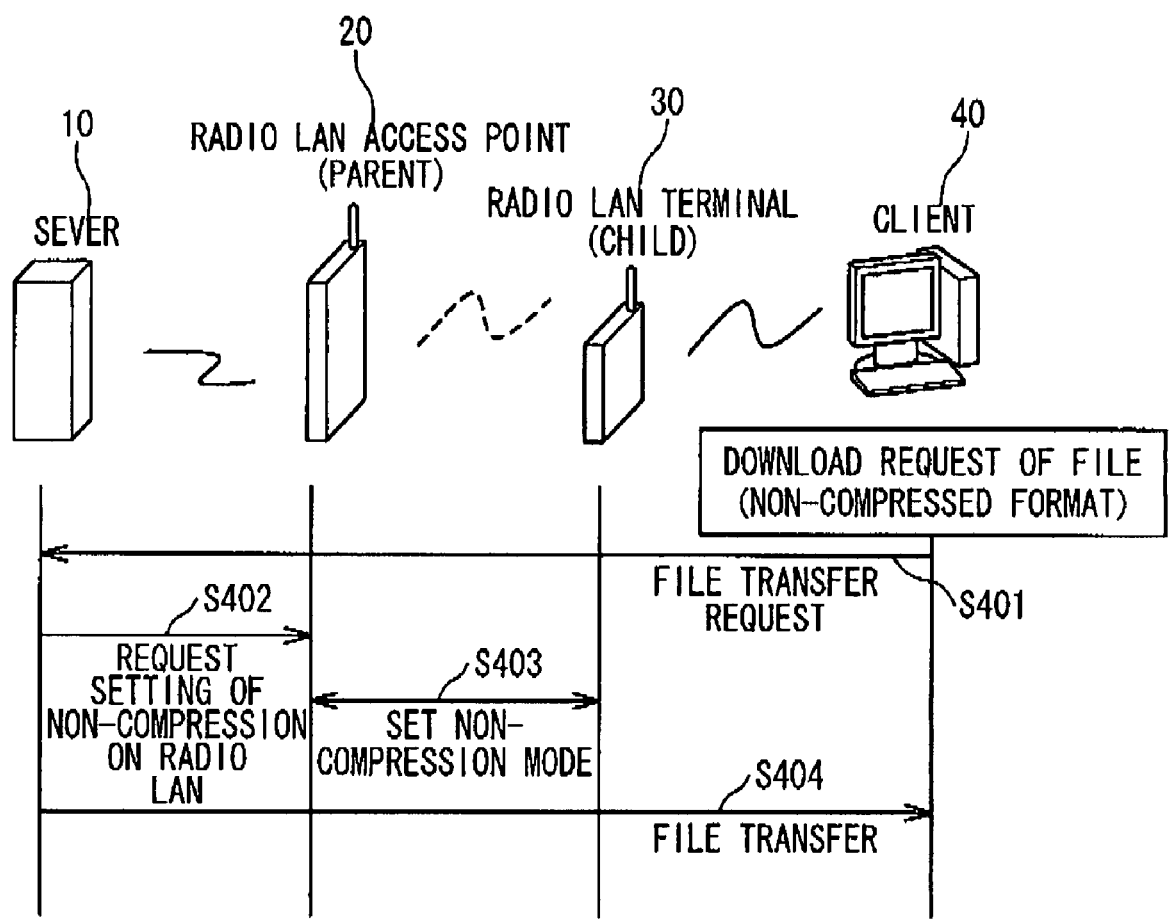
FIG. 8 is a sequence diagram showing an operation when the extension is determined by a server.

FIG. 8 shows an operation performed in case that the extension is determined in the server 10, and the setting is changed by the radio LAN access point (master device) 20.

(1) Step S401

The client terminal 40 issues a file transfer request to the server 10 to transfer the file. In this case, it is assumed that the file is in a compressed format.

(2) Step S402

Since the requested file is in the compressed format, the server 10 requests the radio LAN access point (master device) 20 to set the communication setting to "non-compression mode". At this time, the server 10 determines whether or not the file is compressed, by referring to the extension included in the file name. Alternatively, the server 10 receives a notice of whether or not the file is compressed, at the same time when receiving the transfer request of the file from the client terminal 40.

(3) Step S403

The radio LAN access point (master device) 20 sets the communication setting (communication mode) that has been set between the radio LAN access point 20 and the radio LAN terminal (slave device) 30 as "no compression" so as to perform data non-compression in the communication thereafter. Depending on the circumstances, the connection is disconnected once, and the connection is reestablished thereafter.

(4) Step S404

The server 10 transfers the file to the client terminal 40. At this time, the radio LAN access point (master device) 20 and the radio LAN terminal (slave device) 30 relay the file transfer from the server 10 to the client terminal 40. The communication setting is set to the "non-compression mode" in this case, so that no compression is performed on the file to be transferred.

Figure 9:
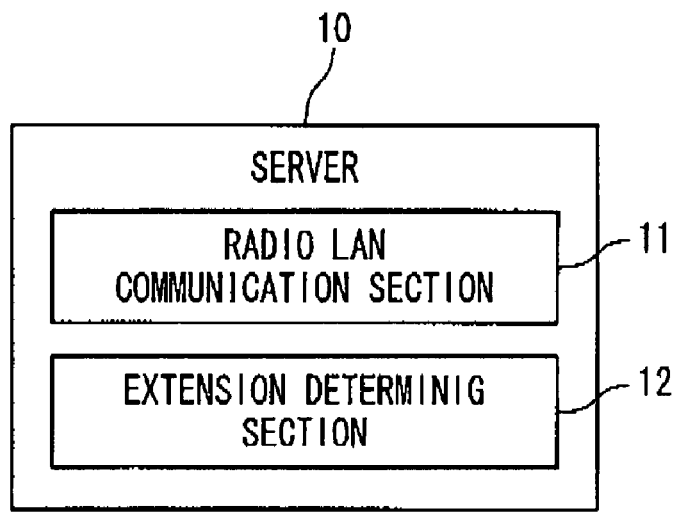
FIG. 9 is a block diagram showing the configuration of the server.

In this case, as shown in FIG. 9, the server 10 includes a radio LAN communication section 11, and an extension determining section 12. The radio LAN communication section 11 communicates with the client terminal 40 on the radio LAN via the radio LAN access point (master device) 20. The extension determining section 12 checks the extension of the transferred file, and determines whether or not the file is in the compressed style. Further, in accordance with the determination result, the extension determining section 12 requests the radio LAN access point (master device) 20 to change the communication setting.

Figure 10:
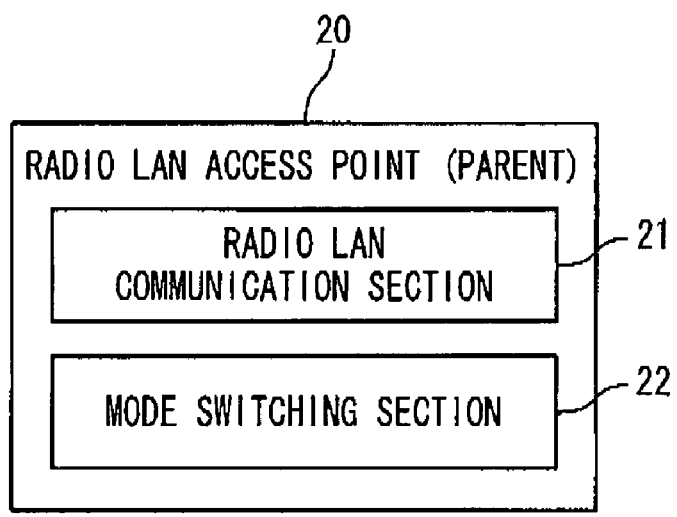
FIG. 10 is a block diagram showing the configuration of a radio LAN access point.

Further, as shown in FIG. 10, the radio LAN access point (master device) 20 may include a radio LAN communication section 21 and a mode switching section 22. The radio LAN communication section 21 performs communication between the server 10 and the radio LAN terminal (slave device) 30. The mode switching section 22 quickly switches the mode between the compression mode and the non-compression mode. Further, the mode switching section 22 also requests the radio LAN terminal (slave device) 30 to switch the mode between the compression mode and the non-compression mode, or executes the mode switching.

Fourth Exemplary Embodiment

Figure 11:
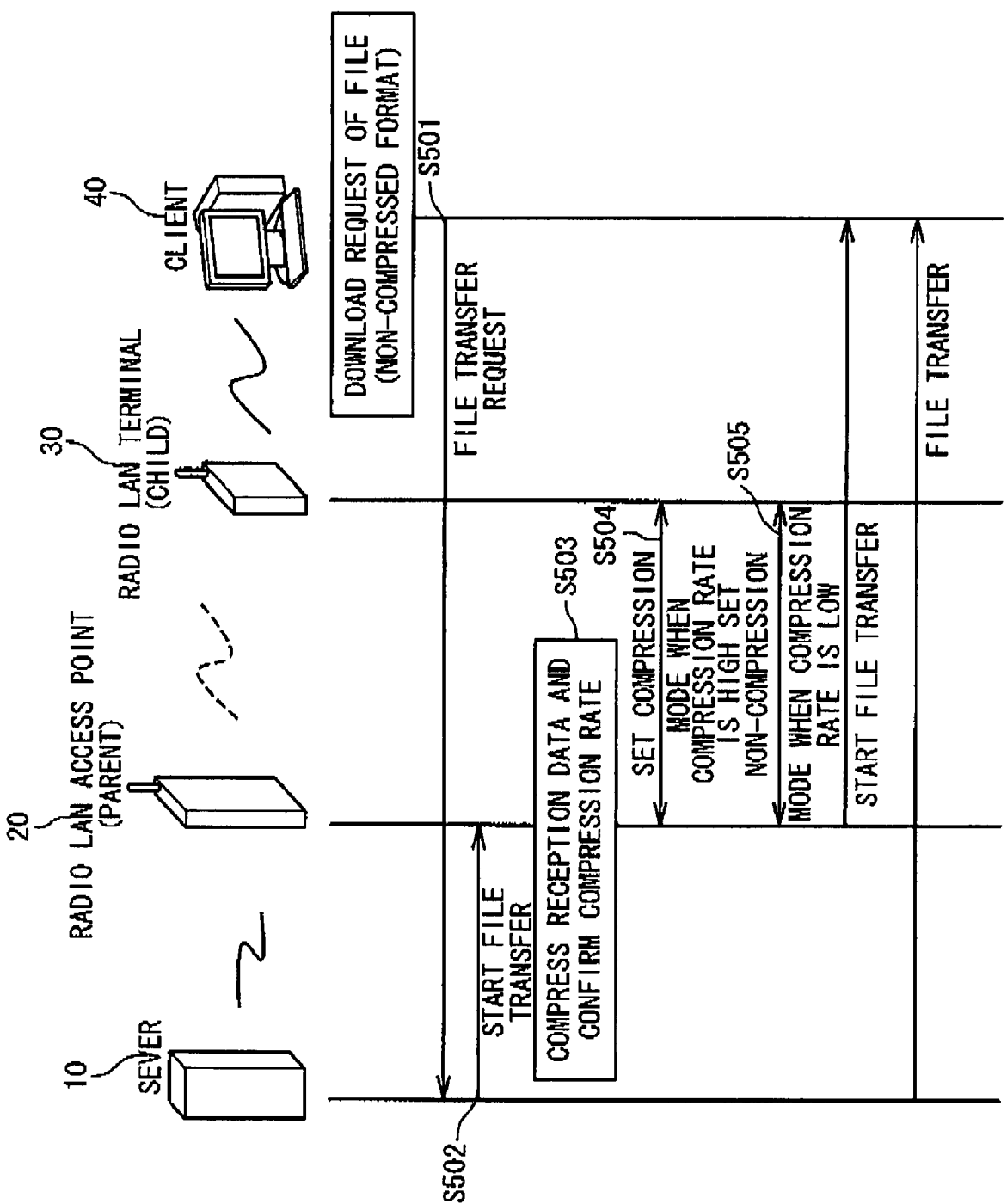
FIG. 11 is a sequence diagram showing an operation when it is impossible to determine the compressed state based on an extension.

The radio LAN system according to a fourth exemplary embodiment of the present invention will be described hereinafter. It is also possible for the radio LAN access point 20 to switch the mode in the same manner even when the compression state cannot be determined based on the extension of the file. FIG. 11 shows an operation when it is impossible to determine the compression state based on the extension of the file, and the mode is switched on the radio LAN access point (master device) 20 side.

(1) Step S501

The client terminal 40 requests the server 10 to transfer the file. The "non-compression" mode is initially set as the communication setting in this case. Alternatively, there is a case that nothing is set initially. This case is determined to be the "non-compression" mode when there is no condition set therein.

(2) Step S502

In response to a file transfer request, the server 10 starts the transfer of the file to the radio LAN access point (master device) 20.

(3) Step S503

The radio LAN access point (master device) 20 checks the data sizes in the compressed state and the uncompressed state. For example, the radio LAN access point (master device) 20 compresses the received data, and checks the compression rate.

(4) Step S504

The radio LAN access point (master device) 20 sets the communication setting between the radio LAN access point 20 and the radio LAN terminal (slave device) 30 to the "compression" mode so as to perform data compression in the communication thereafter, if the compression rate is higher than a predetermined threshold value. Depending on the circumstances, the connection is disconnected once, and it is reconnected thereafter. The threshold value is set in advance. When the compression rate is equal to the predetermined threshold value, the "compression" mode or the "non-compression" mode may be set as the communication setting.

(5) Step S505

The radio LAN access point (master device) 20 sets the communication setting between the radio LAN access point 20 and the radio LAN terminal (slave device) 30 to the "non-compression" mode so as to perform data non-compression in the communication thereafter, if the compression rate is lower than the predetermined threshold value. Depending on the circumstances, the connection is disconnected once, and it is reconnected thereafter.

(6) Step S506

Thereafter, the radio LAN access point (master device) 20 informs to the client terminal 40, that the file transfer is started. At this time, the radio LAN access point (master device) 20 authorizes the transfer of the file from the server 10 to the client terminal 40. That is, a relay of the file transfer from the server 10 to the client terminal 40 is started.

(7) Step S507

The server 10 transfers the file to the client terminal 40. In case of the "compression" mode setting, the file to be transferred is compressed. In case of the "non-compression" mode setting, the file to be transferred is not compressed.

Figure 12:
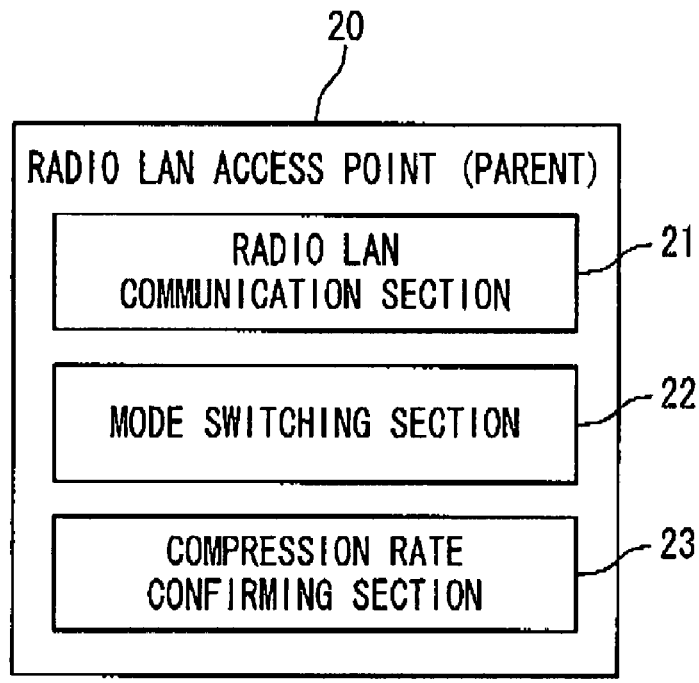
FIG. 12 is a block diagram showing the configuration of the radio LAN access point.

In this case, as shown in FIG. 12, the radio LAN access point (master device) 20 further includes a compression rate checking section 23. The compression rate checking section 23 checks the compression rate of the file, and compares it with a predetermined threshold value. The compression rate confirming section 23 may be included in the mode switching section 22.

Fifth Exemplary Embodiment

Figure 13:
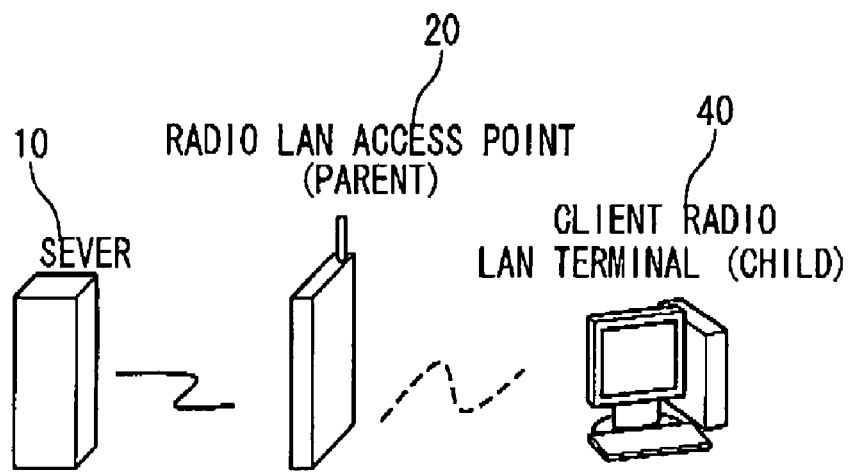
FIG. 13 is a diagram showing the configuration when the client terminal and the radio LAN terminal are integrated.

The radio LAN system according to a fifth exemplary embodiment of the present invention will be described hereinafter. As shown in FIG. 13, it is also possible to form the client terminal 40 and the radio LAN terminal (slave device) 30 into an integrated type. In this case, the operation of the client terminal 40 and the radio LAN terminal (slave device) 30 executed in the other exemplary embodiments described above may be achieved on the same unit.

Sixth Exemplary Embodiment

The radio LAN system according to a sixth exemplary embodiment of the present invention will be described hereinafter. Described herein is an exemplary embodiment of the case that uses a wired LAN. For example, when there is a failure generated in the radio LAN access point (master device) 20 or the radio LAN terminal (slave device) 30 for some reasons and it becomes impossible to perform the radio LAN communication, it may be possible to communicate with a wired LAN temporarily if the server 10 and the client terminal 40 can use the wired LAN.

In this case, it is not possible to apply the data compression of the radio LAN. Therefore, applied is a real-time communication protocol or the like at the higher position of TCP between the server 10 and the client terminal 40.

First, the server 10 transmits the transmission data of a single IP frame as a file to the client terminal 40 without compression. Then, the server 10 transmits the same data with compression. The non-compressed data and the compressed data may be transmitted in no specific order. That is, it is also possible to transmit the transmission data for a single IP frame with compression from the server 10 to the client terminal 40, and then the same data may be transmitted without compression.

The transfer speed at this time is calculated on the client terminal 40 side. When there is recognized an effect of compression, the client terminal 40 makes a request to transmit data with compression, and the server 10 transmits the data while compressing it. If there is no effect, the data is not compressed.

The actual data that flows on a transmission path of the LAN system is in a vessel called a MAC frame (Ethernet (a registered trade mark) frame) to pack the IP packet therein. The IP frame means the MAC frame including the IP packet. A "frame" is a name referring to PDU (protocol data unit) used in communication of the layer 2 (data link layer) of the OSI basic reference model. Examples of the protocol of the layer 2 are Ethernet (a registered trade mark), PPP (point to point protocol), and HDLC (high-level data link control order). The frame is called a MAC frame with Ethernet, a PPP frame with PPP, and an HDLC frame with HDLC. Meanwhile, a "packet" is used in communication of the layer 3 (network layer). Normally, the header information of the IP frame includes a destination IP address, a destination port number, a sender IP address, and a sender port number. This is also the header information of the IP packet. Thus, a single IP packet thereof may be transmitted with no compression as the IP frame. Further, when the data communication protocol is HTTP, it is also possible to use the TCP frame. In case of the TCP frame, there is also included the information of the TCP flag (SYN, ACK, FIN).

Figure 14:
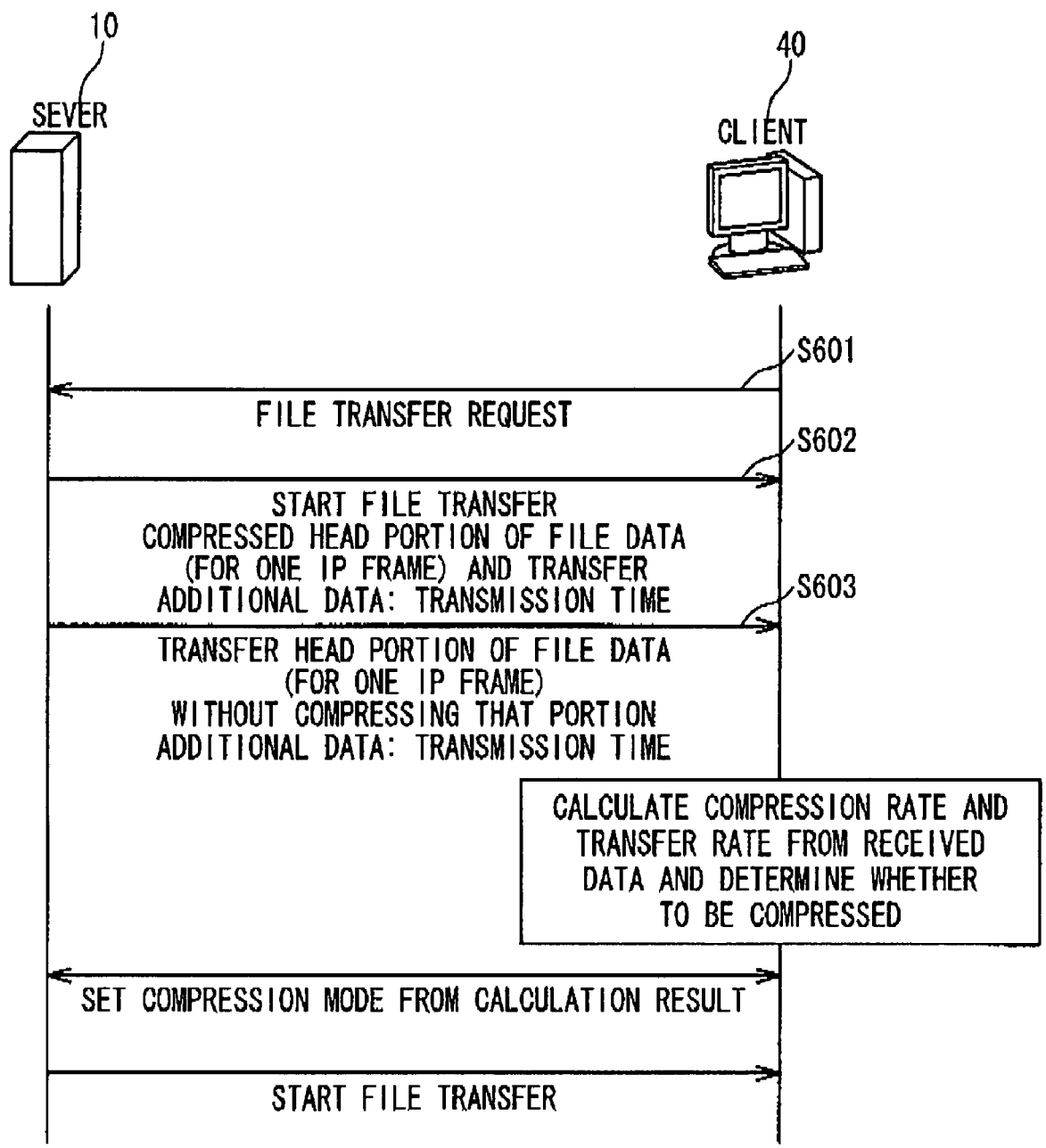
FIG. 14 is a sequence diagram showing an operation when the client terminal and the radio LAN terminal are integrated.

FIG. 14 shows an operation of a case that a wired LAN is used.

(1) Step S601

The client terminal 40 requests the server 10 to transfer the file.

(2) Step S602

The server 10 transfers the file by compressing the head section of the data to the client terminal 40. For example, the data of a single IP frame is transferred with compression. At this time, the transmission time may also be transferred as the additional data.

(3) Step S603

The server 10 transfers the file without compressing the head section of the data to the client terminal 40. For example, the data of a single IP frame is transferred without compression. At this time, the transmission time may also be transferred as the additional information. The step S602 and the step S603 may be executed in an inversed order.

(4) Step S604

The client terminal 40 calculates the compression rate and the transfer speed from the received data, and determines whether or not to perform compression. The compression rate may be calculated from the compressed received data. Alternatively, the received data may be compressed actually and then the compression rate thereof may be checked. There may also be a case where the compression rate is notified from the server 10. The transfer speed is calculated based on the transmission time of the additional data and the received time on the client terminal 40 side.

At this time, the case where the data of single IP frame is transferred with compression may be compared to the case where the data of single IP frame is transferred without compression. Then, it may be determined that the file has been compressed if there is no difference in the transmission speeds between the devices from the server 10 to the client terminal 40, and may be determined that the file is not compressed if there is a different in the transmission speeds.

(5) Step S605

Thereafter, the client terminal 40 sets the compression mode based on the calculated results. Further, the client terminal 40 requests the server 10 to set the compression mode. The server 10 resets the compression mode. Depending on the circumstances, the connection is cut once, and it is reconnected thereafter.

(6) Step S606

The server 10 starts to transfer the file to the client terminal 40 in accordance with the setting of the compression mode.

Figure 15:
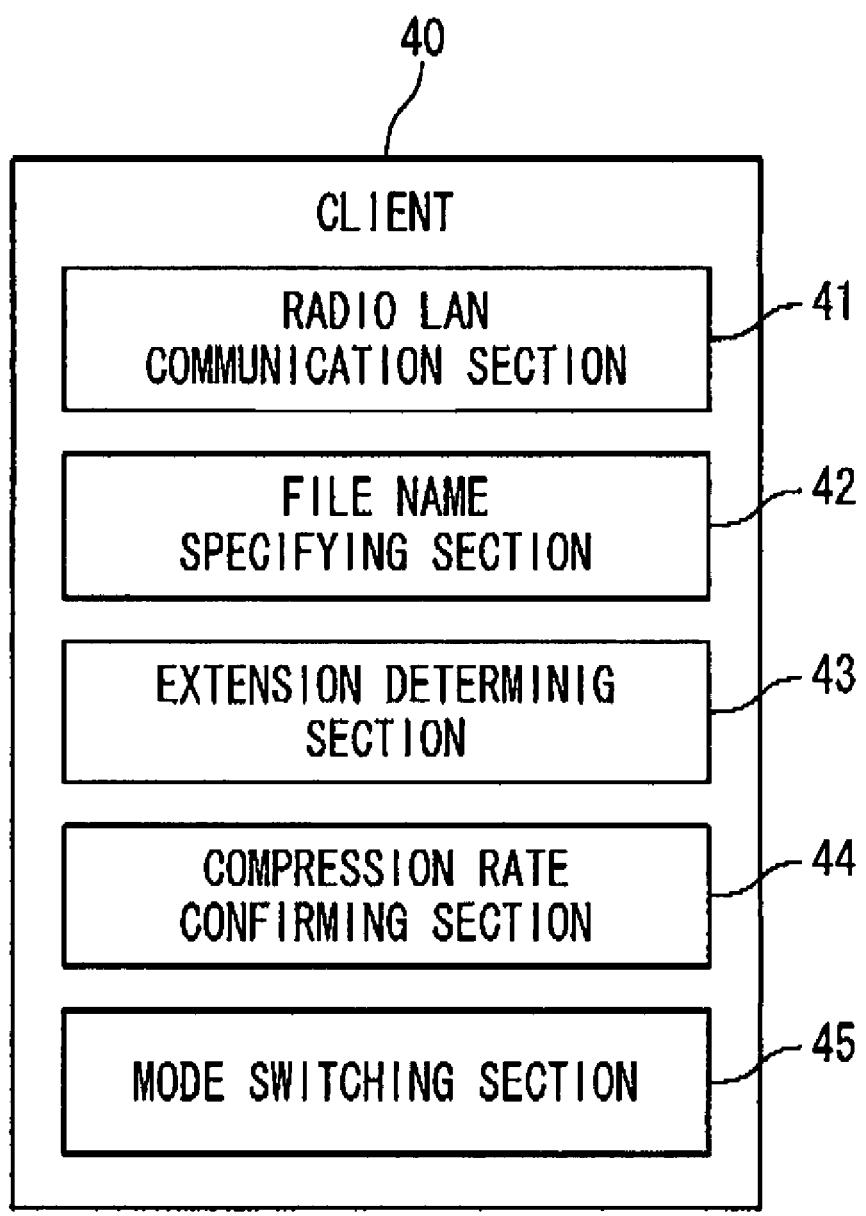
FIG. 15 is a block diagram showing the configuration of the client terminal.

In this case, as shown in FIG. 15, the client terminal 40 further includes a compression rate confirming section 44, and a mode switching section 45. The compression rate confirming section 44 checks the compression rate of the file or the transfer speed, and compares it with a predetermined threshold value. The mode switching section 45 quickly switches the mode between the compression mode and the non-compression mode. The compression rate confirming section 44 may be included in the mode switching section 45.

Compression of the files is executed by a CPU (not shown) which is provided to the server 10 (or the client terminal 40). In practice, however, compression of the files may be executed by a CPU (not shown) which is provided to the radio LAN access point (master device) 20 (or the radio LAN terminal (slave device) 30). In the present exemplary embodiment, it is assumed that the file compression function is included in the radio LAN communication section of the communication apparatus that executes the compression.

It is also possible to execute the operations of each communication devices (the server 10, the radio LAN access point (master device) 20, the radio LAN terminal (slave device) 30, the client terminal 40) in the radio LAN communication system of the present invention by allowing the CPUs of each communication device to execute the programs where the operations of each communication device are defined.

As described above, it is the feature of the present invention to optimize the transfer method in accordance with the types of the data. The present invention improves the transfer speed by dynamically changing the data transfer method in accordance with the types of the data.

It is expected to improve an effective communication speed. Further, this makes it possible to increase the communication data amount further, so that data communication of still higher quality can be achieved in the media that require a real-time communication, such as those used for distributing moving pictures.

Although the present invention has been described above in connection with several embodiments thereof, it will be apparent to those skilled in the art that those embodiments are provided solely for illustrating the present invention, and should not be relied upon to construe the appended claims in a limiting sense.

What is claimed is:

1. A radio LAN system comprising:
a server configured to hold a file;
an access point connected with said server;
a LAN terminal connected with said access point by radio; and
a client terminal configured to issue a file transfer request to said server,
wherein an operation mode between said access point and said LAN terminal is set to a non-compression mode in which compression of said file is not performed, when said file is in a compressed state, and to a compression mode in which compression of said file is performed, when said file is in a non-compressed state, and
said file is transferred from said server to said client terminal in the operation mode in response to the file transfer request.

2. The radio LAN system according to claim 1, wherein said client terminal issues a mode setting request to said LAN terminal based on an extension of a file name of said file,
said LAN terminal sets one of said non-compression mode and said compression mode in response to the mode setting request from said client terminal, and then notifies completion of the setting to said client terminal, and
said client terminal issues said file transfer request to said server in response to the notice from said LAN terminal.

3. The radio LAN system according to claim 1, wherein said LAN terminal sets one of said non-compression mode and said compression mode based on an extension of a file name of said file, and then notifies completion of the setting to said client terminal, and
said client terminal issues said file transfer request to said server in response to the notice from said LAN terminal.

4. The radio LAN system according to claim 1, wherein said server issues a mode setting request to said access point based on an extension of a file name of said file in response to said file transfer request;
said access point sets one of said non-compression mode and said compression mode in response to the mode setting request from said server, and then notifies completion of the setting to said server, and
said server transmits said file to said client terminal through said access point and said LAN terminal in response to the notice from said access point.

5. The radio LAN system according to claim 1, wherein one of said LAN terminal and said access point receives at least a portion of said file from said server, confirms a compression rate of said file, and set as the operation mode, said compression mode when the compression rate is higher than a threshold value, and said non-compression mode when the compression rate is lower than the threshold value, and then notifies completion of the setting to said server, and
said server transmits said file to said client terminal through said access point and said LAN terminal in response to the notice from the one of said LAN terminal and said access point.

6. The radio LAN system according to claim 1, wherein said server transmits a head portion of said file to said client terminal,
said client terminal compares a transmission time with compression of said head portion and a transmission time with non-compression of said head portion, determines whether said file is to be compressed, based on the comparison result, and sets the operation mode based on the determination result, and then notifies completion of the setting of the operation mode, and
said server transmits said file to said client terminal through said access point and said LAN terminal in response to the notice from said client terminal.

7. The radio LAN system according to claim 1, wherein said LAN terminal is built-in said client terminal.

8. A method of setting an operation mode, comprising:
providing a radio LAN system comprising a server, an access point; a LAN terminal; and a client terminal;
setting an operation mode between said access point and said LAN terminal to one of a non-compression mode in which compression of a file is not performed, and a compression mode in which compression of said file is performed;
issuing a file transfer request from said client terminal server; and
transferring said file from said server to said client terminal through said access point and said LAN terminal in the operation mode in response to said file transfer request.

9. The method according to claim 8, wherein said setting comprises:
issuing a mode setting request from said client terminal to said LAN terminal based on an extension of a file name of said file;
setting one of said non-compression mode and said compression mode by said LAN terminal in response to the mode setting request from said client terminal;
notifying completion of the setting of the operation mode to said client terminal, and
said client terminal issues said file transfer request to said server in response to the notice from said LAN terminal.

10. The method according to claim 8, wherein said setting comprises:
setting one of said non-compression mode and said compression mode based on an extension of a file name of said file by said LAN terminal; and
notifying completion of the setting of the operation mode to said client terminal, and
said client terminal issues said file transfer request to said server in response to the notice from said LAN terminal.

11. The method according to claim 8, wherein said setting comprises:
issuing a mode setting request from said server issues to said access point based on an extension of a file name of said file in response to said file transfer request;
setting one of said non-compression mode and said compression mode by said access point in response to the mode setting request from said server; and
notifying completion of the setting of the operation mode to said server, and
said server transmits said file to said client terminal through said access point and said LAN terminal in response to the notice from said access point.

12. The method according to claim 8, wherein said setting comprises:
receiving at least a portion of said file from said server by one of said LAN terminal and said access point;

confirming a compression rate of said file;
setting as the operation mode, said compression mode when the compression rate is higher than a threshold value, and said non-compression mode when the compression rate is lower than the threshold value;
notifying completion of the setting of the operation mode to said server, and
said server transmits said file to said client terminal through said access point and said LAN terminal in response to the notice from the one of said LAN terminal and said access point.

13. The method according to claim 8, wherein said setting comprises:
transmitting a head portion of said file from said server to said client terminal;
comparing a transmission time with compression of said head portion and a transmission time with non-compression of said head portion by said client terminal;
determining whether said file is to be compressed, based on the comparison result;
setting the operation mode based on the determination result; and
notifying completion of the setting of the operation mode, and
said server transmits said file to said client terminal through said access point and said LAN terminal in response to the notice from said client terminal.

14. A communication terminal comprising:
a radio LAN communication unit configured to perform communication on a radio LAN;
an extension determining unit configured to determine an operation mode based on an extension of a file name of a file to be transferred on said radio LAN; and
a mode switching unit configured to set one of a compression mode in which said file is compressed, and a non-compression mode in which said file is not compressed.

15. The communication terminal according to claim 14, further comprising:
a compression rate checking unit configured to check a compression rate of said file,
said mode switching unit sets as the operation mode, said compression mode when the compression rate is higher than a threshold value, and said non-compression mode when the compression rate is lower than the threshold value.

16. A method of setting an operation mode, comprising:
relaying data on a radio LAN; and
setting one of a compression mode in which a file is compressed, and a non-compression mode in which said file is not compressed in response to a request received externally checking a compression rate, by a compression rate confirming unit, of said file,
Setting as the operation mode, said compression mode when the compression rate is higher than a threshold value, and said non-compression mode when the compression rate is lower than the threshold value.

17. The method according to claim 16, further comprising:
determining an operation mode based on an extension of a file name of a file to be transferred on said radio LAN; and
setting one of a compression mode in which said file is compressed, and a non-compression mode in which said file is not compressed.

* * * * *

UNITED STATES PATENT AND TRADEMARK OFFICE
CERTIFICATE OF CORRECTION

PATENT NO. : 7,715,357 B2  Page 1 of 1
APPLICATION NO. : 11/812587
DATED : May 11, 2010
INVENTOR(S) : Kenji Mangetsu It is certified that error appears in the above-identified patent and that said Letters Patent is hereby corrected as shown below:

On the front cover of the Patent include the Foreign Application Priority Data:

(30) Foreign Application Priority Data
Jun. 21, 2006 (JP)................ 2006-171928

Signed and Sealed this

Twenty-seventh Day of July, 2010

David J. Kappos
*Director of the United States Patent and Trademark Office*